US012698416B2

(12) United States Patent
Mahfouz et al.

(10) Patent No.: US 12,698,416 B2
(45) Date of Patent: Aug. 4, 2026

(54) SURFACE GLOSS COMPOSITIONS AND METHODS OF USE THEREOF

(71) Applicant: Energizer Auto, Inc., St. Louis, MO (US)

(72) Inventors: Grace Nabil Mahfouz, Rocky River, OH (US); Christopher Stacey, Cleveland, OH (US)

(73) Assignee: Energizer Auto, Inc., St. Louis, MO (US)

( * ) Notice: Subject to any disclaimer, the term of this patent is extended or adjusted under 35 U.S.C. 154(b) by 832 days.

(21) Appl. No.: 17/986,111

(22) Filed: Nov. 14, 2022

(65) Prior Publication Data

US 2023/0151245 A1     May 18, 2023

Related U.S. Application Data

(60) Provisional application No. 63/263,960, filed on Nov. 12, 2021.

(51) Int. Cl.
| | |
|---|---|
| *C09D 183/00* | (2006.01) |
| *C09D 5/02* | (2006.01) |
| *C09D 7/63* | (2018.01) |
| *C09D 183/08* | (2006.01) |
| *B05D 1/02* | (2006.01) |

(52) U.S. Cl.
CPC ........... *C09D 183/08* (2013.01); *C09D 5/025* (2013.01); *C09D 7/63* (2018.01); *B05D 1/02* (2013.01)

(58) Field of Classification Search
CPC ........ C09D 183/08; C09D 7/63; C09D 5/025; B05D 1/02
USPC ...................................... 106/287.11
See application file for complete search history.

(56) References Cited

FOREIGN PATENT DOCUMENTS

| | | | |
|---|---|---|---|
| KR | 20160073484 A | 6/2016 | |
| WO | WO2020208905 A1 | 10/2020 | |
| WO | WO-2021216514 A1 * | 10/2021 | ........... C09D 183/08 |
| WO | WO-2021216534 A1 * | 10/2021 | ........... C09D 183/08 |

OTHER PUBLICATIONS

International Preliminary Report on Patentability dated May 23, 2024 fo corresponding International Application No. PCT/US2022/049770 (5 pages.

International Search Report and Written Opinion mailed Mar. 13, 2023 for PCT Application No. PCT/US2022/049770 (10 pages).

* cited by examiner

*Primary Examiner* — James E McDonough
(74) *Attorney, Agent, or Firm* — Lee & Hayes, P.C.

(57) ABSTRACT

Described herein are compositions and methods for use in automotive care. In particular, the present disclosure is directed to water-based compositions comprising a silicone emulsion that are particularly beneficial as a gloss booster, enhancer, and/or sealant.

14 Claims, No Drawings

SURFACE GLOSS COMPOSITIONS AND METHODS OF USE THEREOF

CROSS REFERENCE TO RELATED APPLICATION

This application claims the benefit of priority to U.S. Provisional Patent Application Ser. No. 63/263,960, entitled "Surface Gloss Compositions and Methods of Use Thereof," filed on Nov. 12, 2021, the content of which is hereby incorporated by reference in its entirety.

FIELD OF THE DISCLOSURE

The present disclosure is directed to compositions and methods for use in automotive care. In particular, the present disclosure is directed to water-based compositions comprising a silicone emulsion that are particularly beneficial as a gloss booster, enhancer, and/or sealant.

BACKGROUND OF THE DISCLOSURE

Gloss-enhancing products currently on the market for automotive surfaces offer to enhance gloss. However, there are various drawbacks and issues with these products. Moreover, one must use multiple products to deliver hydrophobicity, durability, and gloss properties.

There remains a need, therefore, to provide an automotive surface gloss composition—in one product—that is capable to deliver hydrophobicity, durability, and gloss properties to the surface.

SUMMARY OF THE DISCLOSURE

In one aspect, the present disclosure is directed to a composition comprising: a non-ionic amino functional silicone emulsion and a preservative.

In another aspect, the present disclosure is directed to method of treating an automotive surface, the method comprising: applying a composition to the automotive surface, wherein the composition comprises: a non-ionic amino functional silicone emulsion and a preservative.

DETAILED DESCRIPTION OF THE DISCLOSURE

Described herein is water-based automotive care composition that is particularly beneficial as a gloss booster, enhancer, and/or sealant. It is particularly beneficial for hard, exterior automotive surfaces (e.g. paint, trim, wheels, tires, glass, mirrors, etc.).

In addition to acting as a gloss booster, enhancer, and/or sealant, the composition according to the present disclosure boosts color depth and revitalizes the look of automotive surfaces. It can be applied on top of waxes, sealants, and coatings. It can also be applied in-between car washes. The composition is configured to impart hydrophobicity (water repellency) and durability to the surface.

In many embodiments, the composition protects surfaces by implementing hydrophobic polymers to repel water and aqueous solutions.

In some embodiments, the composition comprises a non-ionic amino functional silicone emulsion and a preservative. In some embodiments, the composition is used as part of a method to treat an automotive surface by applying the composition to the automotive surface.

In some embodiments of the present disclosure, the non-ionic amino functional silicone emulsion contributes to the hydrophobicity and durability of the composition. In some embodiments, the non-ionic amino functional silicone emulsion comprises an aminoalkyl-functional organopolysiloxane fluid and water. In some embodiments, the non-ionic amino functional silicone emulsion comprises a non-ionic emulsifier. In some embodiments, the non-ionic amino functional silicone emulsion comprises water. In some embodiments, the aminoalkyl-functional organopolysiloxane fluid is selected from the group consisting of an amine-alkyl/dimethyl copolymer, a polar amine/alkyl functional block, an amine/alkoxy end-blocked silicone, and combinations thereof. In some embodiments, the non-ionic amino functional silicone emulsion is selected from the group consisting of APS-385B, APS-ME357, Siltech E-4135, LK-Primasoft Power, ICM EM 1616, and combinations thereof.

In some embodiments, the amino functional silicone emulsion has a pH of from about 3 to about 6. In some embodiments, the amino functional silicone emulsion has a pH of from about 5 to about 6. In some embodiments, the amino functional silicone emulsion starts to destabilize at higher pH, such as a range of 10 and above, and/or by using strong alkaline agents.

In some embodiments, the compositions do not comprise a base to modify the pH.

In some embodiments, the non-ionic amino functional silicone emulsion is soluble in water. In some embodiments, the non-ionic amino functional silicone emulsion is present in an amount of from about 0.1%, about 0.5%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, or about 19% to about 0.5%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20%, by weight of the composition.

In some embodiments, the non-ionic amino functional silicone emulsion is present in an amount of from about 0.1% to about 20%, by weight of the composition. In some embodiments, the non-ionic amino functional silicone emulsion is present in an amount of from about 0.1% to about 12%, by weight of the composition. In some embodiments, the non-ionic amino functional silicone emulsion is present in an amount of from about 0.1% to about 6%, by weight of the composition. In some embodiments, the non-ionic amino functional silicone emulsion is present in an amount of from about 6% to about 12%, by weight of the composition.

In some embodiments, the preservative is present in an amount of from about 0.01%, about 0.05%, about 0.1%, about 0.15%, about 0.20%, about 0.21%, about 0.22%, about 0.23%, about 0.24%, or about 0.25% to about 0.1%, about 0.15%, about 0.2%, about 0.21%, about 0.22%, about 0.23%, about 0.24%, about 0.25%, about 0.3%, about 0.35%, about 0.4%, about 0.45%, or about 0.5%, by weight of the composition.

In some embodiments, the preservative is present in an amount of from about 0.01% to about 0.5%, by weight of the composition. In some embodiments, the preservative is present in an amount of from about 0.05% to about 0.25%, by weight of the composition.

Generally, the preservative may be any suitable preservative known in the art. In many embodiments, the preservative is not a formaldehyde donor. In some embodiments, the preservative is selected from the group consisting of Troyguard BC11, Uniquat QAC 50, and combinations thereof. Troyguard BC11 includes a mixture of benzisothi-azol-3(2h)-one, 5-chloro-2-methyl-4-isothiazolin-3-one, and 2-methyl-2H-isothiazol-3-one.

In some embodiments, the composition comprises water. In some embodiments, the water is present in an amount of from about 65% to about 99%, from about 70% to about 95%, from about 85% to about 95%, or from about 85% to about 90% by weight of the composition.

In some embodiments, the composition further comprises an additive selected from the group consisting of a surfac-tant, a solvent (other than water or in addition to water), a fragrance, a chelating agent, and combinations thereof.

In some embodiments, the composition further comprises a surfactant. In some embodiments, the composition further comprises a non-ionic surfactant. In some embodiments, the composition comprises a surfactant in an amount in the range of from about 0.5% to about 3%, by weight of the composition. In some embodiments, the composition com-prises a surfactant selected from the group consisting of Tergitol EH-9 (2-ethyl hexanol EO-PO nonionic surfactant), Tergitol NP-9.5, and combinations thereof.

In some embodiments, the composition further comprises a solvent (other than water or in addition to water). In some embodiments, the composition comprises a solvent in an amount in the range of from about 1% to about 5% by weight of the composition. In some embodiments, the composition comprises an isopropanol or diethylene glycol monobutyl ether (butyl carbitol) solvent.

In some embodiments, the composition further comprises a fragrance. In some embodiments, the composition further comprises an automotive fragrance. In some embodiments, the composition comprises a fragrance in an amount in the range of from about 0.01% to about 2% by weight of the composition. In some embodiments, the composition com-prises a 455295 Porsche stable mod fragrance or orange oil such as Orange Oil X5 (D-limonene 80%).

In some embodiments, the composition further comprises a chelating agent. In some embodiments, the composition comprises a chelating agent in an amount sufficient for chelation. In some embodiments, the composition comprises citric acid as a chelating agent. The citric acid can be in the form of a powder or a preblend (citric acid 50 w/wt %).

In some embodiments of the present disclosure, the com-position consists essentially of a non-ionic amino functional silicone emulsion, a preservative, and water. As used herein, consisting essentially of means that the composition option-ally comprises small amounts of impurities. These impuri-ties may be, for example, salts, minerals, metals, dissolved and/or suspended solids, and combinations thereof.

In some embodiments, the composition consists of a non-ionic amino functional silicone emulsion, a preserva-tive, and water.

In some embodiments of the present disclosure, the com-position is applied to an automotive surface. In some embodiments, the automotive surface is selected from the group consisting of a tire, wheel, glass, paint, hood, roof, trunk, an exterior part, and combinations thereof.

In some embodiments, the composition is a fluid, such as a liquid, and the liquid is applied by the means of an aerosol, a trigger sprayer, a sponge, a microfiber cloth, and combi-nations thereof. In some embodiments, the composition is a trigger sprayer fluid. In some embodiments, the composition is sprayed on a car surface and then wiped off the car surface.

EXAMPLES

Without further elaboration, it is believed that one skilled in the art using the preceding description can utilize the present invention to its fullest extent. The following Examples are, therefore, to be construed as merely illustra-tive, and not limiting of the disclosure in any way whatso-ever.

Example 1: High Gloss Enhancer Formulations

A sample composition in accordance with the present disclosure is shown in Table 1. The composition has a clear and transparent to slightly cloud appearance. It has a pH of 5.57 and a water-thin viscosity.

TABLE 1

| Sample high gloss enhancer formulation. | |
| --- | --- |
| Component | Weight Percent |
| Water DI/RO | 94.9 |
| Troyguard BC11 | 0.1 |
| Aps 385B (25% active) | 5 |
| Total | 100 |

A sample composition in accordance with the present disclosure is shown in Table 2.

TABLE 2

| Sample high gloss enhancer formulation. | |
| --- | --- |
| Component | Weight Percent |
| Water DI/RO | 86.7 |
| Troyguard BC11 | 0.1 |
| Aps 385B (25% active) | 10 |
| Tergitol EH-9 | 0.25 |
| Isopropyl Alcohol | 2.9 |
| Fragrance 455295 Porsche stable mod | 0.05 |
| Citric acid (powder) | Q.S. |
| Total | 100 |

A sample composition in accordance with the present disclosure is shown in Table 3.

TABLE 3

| Sample high gloss enhancer formulation. | |
| --- | --- |
| Component | Weight Percent |
| Water DI/RO | 85.95 |
| Troyguard BC11 | 0.1 |
| Aps 385B (25% active) | 10 |
| Tergitol NP-9.5 | 1 |
| Isopropyl Alcohol | 2.9 |
| Fragrance 455295 Porsche stable mod | 0.05 |
| Citric acid (powder) | Q.S. |
| Total | 100 |

Example 2: High Gloss Enhancer Formulations

A sample composition in accordance with the present disclosure is shown in Table 4. The composition has a clear and transparent to clear appearance and an orange odor. It has a pH of between 5 and 6 and a water-thin viscosity.

Citric acid is added last and is added piecewise. The pH of the composition should be checked before and after adding the citric acid to make sure the pH of the solution is between 5 and 6.

5

TABLE 4

Sample high gloss enhancer formulation.

| Component | Weight Percent |
|---|---|
| Water DI/RO | 87.375 |
| Troyguard BC11 | 0.1 |
| Aps 385B (25% active) | 10 |
| Tergitol EH-9 | 0.25 |
| Isopropyl Alcohol | 2.2 |
| Orange oil X5 | 0.05 |
| Citric acid (preblend) | Q.S. |
| Total | 100 |

TABLE 5

Sample high gloss enhancer formulation.

| Component | Weight Percent |
|---|---|
| Water DI/RO | 86.75 |
| Troyguard BC11 | 0.1 |
| Aps 385B (25% active) | 10 |
| Tergitol EH-9 | 0.25 |
| Butyl Carbitol | 2.9 |
| Orange oil X5 | 0.05 |
| Citric acid (preblend) | Q.S. |
| Total | 100 |

Example 3: High Gloss Enhancer Formulations

A sample composition in accordance with the present disclosure is shown in Table 6. The composition has a clear and transparent to slightly cloud appearance. It has a pH of about 6 and a water-thin viscosity.

TABLE 6

Sample high gloss enhancer formulation.

| Component | Weight Percent |
|---|---|
| Water DI/RO | 89.9 |
| Troyguard BC11 | 0.1 |
| APS-ME357 (28% active) | 10 |
| Total | 100 |

This written description uses examples to illustrate the present disclosure, including the best mode, and also to enable any person skilled in the art to practice the disclosure, including making and using any compositions or systems and performing any incorporated methods. The patentable scope of the disclosure is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Where an invention or a portion thereof is defined with an open-ended term such as "comprising," it should be readily understood that (unless otherwise stated) the description should be interpreted to also describe such an invention using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

As used herein, the term "about" means plus or minus 10% of the value.

What is claimed is:

1. A composition consisting of:
   a non-ionic amino functional silicone emulsion; and
   a preservative; and
   water.

2. The composition of claim 1, wherein the non-ionic amino functional silicone in the emulsion is an aminoalkyl-functional organopolysiloxane fluid.

3. The composition of claim 1, wherein the non-ionic amino functional silicone emulsion is present in an amount of from about 0.1% to about 15% by weight of the composition.

4. The composition of claim 1, wherein the non-ionic amino functional silicone in the emulsion is selected from the group consisting of an amine-alkyl/dimethyl copolymer, a polar amine/alkyl functional block, an amine/alkoxy end-blocked silicone, and combinations thereof.

5. The composition of claim 1, wherein the preservative is present in an amount of from about 0.01% to about 0.5% by weight of the composition.

6. The composition of claim 1, wherein the preservative is a mixture of benzisothiazol-3 (2h)-one, 5-chloro-2-methyl-4-isothiazolin-3-one, and 2-methyl-2H-isothiazol-3-one.

7. The composition of claim 1, wherein the water is present in an amount of from about 65% to about 99% by weight of the composition.

8. A composition consisting of:
   a non-ionic amino functional silicone emulsion;

a preservative;

water; and one or more additives selected from the group consisting of a surfactant, a solvent, a fragrance, and a chelating agent.

9. A method of treating an automotive surface, the method comprising:

applying the composition of claim 1 to the automotive surface.

10. The method of claim 9, wherein the automotive surface is selected from the group consisting of a tire, wheel, glass, paint, hood, roof, trunk, an exterior part, and combinations thereof.

11. The method of claim 9, wherein the composition is applied by the means of a trigger sprayer.

12. A method of treating an automotive surface, the method comprising:

applying the composition of claim 8 to the automotive surface.

13. The method of claim 12, wherein the automotive surface is selected from the group consisting of a tire, wheel, glass, paint, hood, roof, trunk, an exterior part, and combinations thereof.

14. The method of claim 12, wherein the composition is applied by the means of a trigger sprayer.

\* \* \* \* \*